(12) United States Patent
Perkins

(10) Patent No.: US 10,899,404 B2
(45) Date of Patent: Jan. 26, 2021

(54) DOOR HOIST APPARATUSES INCLUDING MULTI-BAR ACTUATION ASSEMBLIES WITH SUCTION END EFFECTORS AND METHODS USING THE SAME

(71) Applicant: Toyota Motor Engineering & Manufacturing North America, Inc., Erlanger, KY (US)

(72) Inventor: Blair C. Perkins, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 173 days.

(21) Appl. No.: 15/877,821

(22) Filed: Jan. 23, 2018

(65) Prior Publication Data

US 2019/0225290 A1    Jul. 25, 2019

(51) Int. Cl.
*B62D 65/06* (2006.01)
*B62D 65/02* (2006.01)
(Continued)

(52) U.S. Cl.
CPC .............. *B62D 65/06* (2013.01); *B25J 11/005* (2013.01); *B25J 15/0683* (2013.01);
(Continued)

(58) Field of Classification Search
CPC ......... B62D 65/06; B25J 5/02; B25J 15/0616; B25J 9/106; B25J 9/06; B25J 9/1065;
(Continued)

(56) References Cited

U.S. PATENT DOCUMENTS 4,051,746 A * 10/1977 Liljeros ..................... B60P 1/26
74/520
4,589,184 A   5/1986 Asano et al.
(Continued)

FOREIGN PATENT DOCUMENTS

DE    102005039817    3/2017
FR         2973360  * 10/2012
WO       2017153154    9/2017

OTHER PUBLICATIONS

"Powered End Effectors & Lift Assists", http://www.giveng.com/end-effectors;Toledo, OH (2017), 18 pages.

*Primary Examiner* — Tyrone V Hall, Jr.
*Assistant Examiner* — Mahdi H Nejad
(74) *Attorney, Agent, or Firm* — Dinsmore & Shohl LLP

(57) ABSTRACT

A multi-bar actuation assembly for use in installing a vehicle door to a vehicle includes a drive comprising a piston arm and a casing that movably receives the piston arm, a multi-bar linkage that includes a base support structure, a first bar link pivotally connected to the base support structure, a second bar link pivotally connected to the drive and the base support structure, and a toggle link that connects the first bar link and the second bar link, and a suction end effector pivotally connected to the toggle link at an end effector pivot that engages a window of the vehicle door. The drive extends and contracts the piston arm thereby moving the end effector pivot along a door arc about a door pivot axis with the suction end effector engaged with the window of the vehicle door.

18 Claims, 4 Drawing Sheets

(51) Int. Cl.
*B25J 15/06* (2006.01)
*B25J 11/00* (2006.01)
*B25J 5/02* (2006.01)

(52) U.S. Cl.
CPC .............. *B62D 65/026* (2013.01); *B25J 5/02* (2013.01); *Y10S 901/23* (2013.01); *Y10S 901/24* (2013.01); *Y10S 901/40* (2013.01)

(58) Field of Classification Search
CPC . B25J 9/107; B25J 11/00; B66F 9/181; B66C 23/005
USPC ..... 29/11; 74/520, 99 R, 469, 479.01, 480 R
See application file for complete search history.

(56) References Cited

U.S. PATENT DOCUMENTS

| | | | | |
|---|---|---|---|---|
| 4,616,411 | A | * | 10/1986 | Suzuki ................... B62D 65/06 29/822 |
| 4,961,257 | A | | 10/1990 | Sakamoto et al. |
| 4,991,707 | A | | 2/1991 | Alexander et al. |
| 5,033,163 | A | * | 7/1991 | Kaibuki ................ B23P 19/04 16/386 |
| 5,040,290 | A | | 8/1991 | Usui et al. |
| 5,123,148 | A | * | 6/1992 | Ikeda ...................... B23P 19/02 29/11 |
| 5,150,506 | A | | 9/1992 | Kotake et al. |
| 5,181,307 | A | * | 1/1993 | Kitahama .............. B62D 65/06 29/11 |
| 2010/0319193 | A1 | * | 12/2010 | Ushio ....................... B25J 5/02 29/822 |
| 2017/0151491 | A1 | * | 6/2017 | Collins ............... B66F 9/07554 |
| 2020/0039093 | A1 | * | 2/2020 | Yamanaka ............... B25J 9/106 |

\* cited by examiner

DOOR HOIST APPARATUSES INCLUDING MULTI-BAR ACTUATION ASSEMBLIES WITH SUCTION END EFFECTORS AND METHODS USING THE SAME

TECHNICAL FIELD

The present specification generally relates to apparatuses for installing doors during vehicle assembly and, more specifically, door hoist apparatuses including multi-bar actuation assemblies with suction end effectors for holding, positioning, and installing a vehicle door on a vehicle and methods of using the same.

BACKGROUND

Assembly of vehicles includes the installation or attachment of various components to a main structure of the vehicle within a limited time as the vehicle moves along an assembly line. Such components may be attached to the main structure using a variety of tools and techniques. For example, vehicles generally have one or more vehicle doors that are installed during vehicle assembly. Prior to installation, the door is hoisted and positioned in an installation position. Current mechanisms for hoisting and positioning doors may clamp to the doors, such as, at the A-pillar or at the door window opening. This clamping may damage door structures. Additionally, current hoisting and positioning mechanisms may not be interchangeable across multiple assembly lines or useful for the assembly of multiple body types, or makes and/or models of vehicles. This may result in the construction or design of multiple assembly lines or assembly line components for the assembly of varying types of vehicles.

Accordingly, a need exists for door hoists including multi-bar actuation assemblies with suction end effectors for holding, positioning, and installing a vehicle door on a vehicle and methods of using the same.

SUMMARY

In one embodiment, a multi-bar actuation assembly for use in installing a vehicle door to a vehicle includes a drive comprising a piston arm and a casing that movably receives the piston arm, a multi-bar linkage that includes a base support structure, a first bar link pivotally connected to the base support structure, a second bar link pivotally connected to the drive and the base support structure, and a toggle link that connects the first bar link and the second bar link, and a suction end effector pivotally connected to the toggle link at an end effector pivot that engages a window of the vehicle door. The drive extends and contracts the piston arm thereby moving the end effector pivot along a door arc about a door pivot axis with the suction end effector engaged with the window of the vehicle door.

In another embodiment, a door hoist apparatus for use in installing a vehicle door to a vehicle includes a drive comprising a piston arm and a casing that movably receives the piston arm, a multi-bar linkage including a base support structure, a first bar link pivotally connected to the base support structure, a second bar link pivotally connected to the drive and the base support structure, and a toggle link that connects the first bar link and the second bar link, and a suction end effector pivotally connected to the toggle link at an end effector pivot that engages a window of the vehicle door. The door hoist apparatus further includes a mast that comprises one or more rolling supports that support the vehicle door as the vehicle door is rotated about a door arc pivot axis from a vehicle door initial position to a vehicle door installation position. The drive is actuatable to move the end effector pivot and the suction end effector along a door arc about the door arc pivot axis with the suction end effector engaged with the window of the vehicle door.

In yet another embodiment, a method of installing a vehicle door to a vehicle includes extending a suction end effector comprising one or more suction cups attached to a multi-bar actuation assembly to engage a window of the vehicle door thereby placing the multi-bar actuation assembly in a multi-bar actuation assembly initial position. The multi-bar actuation assembly includes a drive comprising a piston arm and a casing that movably receives the piston arm, a multi-bar linkage that includes a base support structure, a first bar link pivotally connected to the base support structure, a second bar link pivotally connected to the drive and the base support structure, and a toggle link that connects the first bar link and the second bar link. The suction end effector is pivotally connected to the toggle link at an end effector pivot that engages the window of the vehicle door. The method further includes capturing the vehicle door at the window of the vehicle door with the suction end effector and moving the piston arm, thereby moving the end effector pivot along a door arc about a door pivot axis.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

To install a door onto the body of a vehicle being assembled, the door must be hoisted and appropriately positioned with respect to the body. Current mechanisms for hoisting and positioning doors may clamp to the doors, such as, at the A-pillar portion of the door or at the door window opening. This clamping force may cause damage to the body of the door, the door window frame, or the glass of the door window resulting in the need for costly repairs and/or inefficient delays in production.

Door hoist apparatuses for hoisting, positioning, and installing a vehicle door that do not touch the A-pillar portion of the door or the door window frame are described herein. The door hoist apparatuses described herein use suction to fasten to the door at the door window. For example, one or more suction end effectors may temporarily fix to the window of a vehicle door to hold the vehicle door in place and manipulate the vehicle door into a position suitable for installation. It should be further understood that reduction or elimination of shear force between the window and the suction end effectors may be possible if relative motion between the window and the suction end effectors is reduced or eliminated. To reduce or eliminate shear force between the window and the suction end effectors, the suction end effectors may follow the same arc as the vehicle door they pull to rotate the vehicle door into the installation position. Accordingly, a door hoist apparatus including multi-bar actuation assemblies with suction end effectors for holding, positioning, and installing a vehicle door on a vehicle is described herein.

Figure 1:
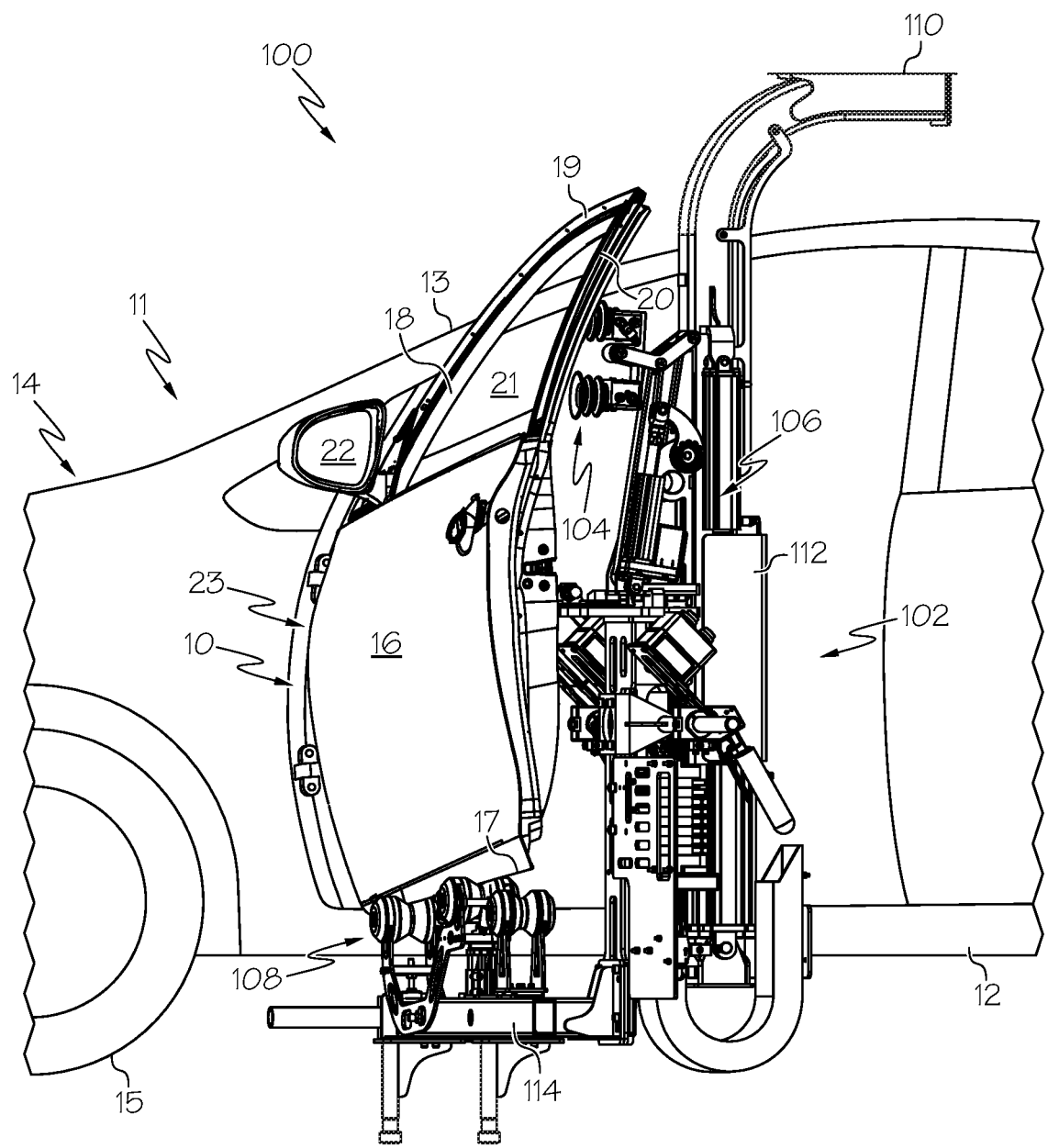
FIG. 1 depicts a vehicle door and a door hoist including a multi-bar actuation assembly including suction end effectors, according to one or more embodiments shown and described herein.

Referring now to FIG. 1, a door hoist apparatus 100 including a mast 102, one or more suction end effectors 104 disposed on a multi-bar actuation assembly 106 and one or more rolling supports 108 is shown holding a vehicle door 10 for installation on a vehicle 11 having a vehicle frame 12 as the vehicle 11 moves along an assembly line or is otherwise assembled. The vehicle frame 12 may include, among other things, an A-pillar 13, and a front end 14 that includes one or more wheels 15. The vehicle door 10 may comprise a main body 16 including a bottom edge 17, an A-pillar portion 18, a top rail 19, a B-pillar portion 20, a window 21, a sideview mirror 22, and a vehicle inward side 23. The A-pillar portion 18, top rail 19, and B-pillar portion 20 may surround the window 21. The window 21 may be slidable up and down within the main body 16 of the vehicle door 10.

As shown in FIG. 1, during assembly of the vehicle 11, the bottom edge 17 of the main body 16 of the vehicle door 10 may rest in the rolling supports 108, supporting the main body 16 to hoist the vehicle door 10 by moving the mast 102 or portions thereof up or down. The suction end effectors 104 may removably couple to the window 21 using suction pressure, such as provided through the suction end effectors 104 by a vacuum source. The suction end effectors 104 may be pivotally disposed on the multi-bar actuation assembly 106 and the multi-bar actuation assembly 106 may be configured to enable rotation of the vehicle door 10 about the interface between the rolling supports 108 and the bottom edge 17. The vehicle door 10 may then be slid in the vehicle inward direction until the vehicle door 10 can be installed on the vehicle 11 at the vehicle inward side 23 of the vehicle door 10.

The mast 102 may include a top portion 110, a middle portion 112, and a bottom portion 114. The rolling supports 108 may be disposed on the bottom portion 114 and provide a support to hoist the vehicle door 10 with the bottom portion 114. The middle portion 112 may be configured to extend and retract. For example, the middle portion 112 may be telescoping, such that the bottom portion 114 and the rolling supports 108 can move the vehicle door 10 up and down to position the vehicle door for installation on the vehicle 11. Additionally, the multi-bar actuation assembly 106 and the rolling supports 108 may be configured on separate portions of the mast 102 such that as the middle portion 112 extends and retracts, the vertical distance between the multi-bar actuation assembly 106 and the rolling supports 108 can extend or retract. The top portion 110 may be supported by the roof of the assembly facility or some other structure, for example, the mast 102 may hang from the roof of the assembly facility at the top portion 110.

The rolling supports 108 may comprise one or more rollers or other mechanisms for supporting the vehicle door 10 and pushing it in the vehicle inward direction to place it against the vehicle frame 12 for installation of the vehicle door 10 as will be described below. In some embodiments, one or more of the rolling supports 108 may comprise a concave profile such that one or more of the rolling supports 108 includes a trough, the nadir of which the bottom edge 17 of the vehicle door 10 naturally comes to rest in when the vehicle door 10 is supported by the rolling supports. Further, in some embodiments, the nadir of each of the rolling supports 108 may be aligned along a straight line extending in the vehicle lateral direction and parallel to the bottom edge 17 of the vehicle door 10. In this way, the rolling supports 108 may prevent the bottom edge 17 of the vehicle door 10 from moving in the vehicle forward or backward direction, fixing the translative movement of the bottom of the vehicle door 10 in the vehicle longitudinal direction, and enabling the bottom edge 17 to act as a pivot for the vehicle door 10 as described in greater detail below. Additionally, in some embodiments, the rolling supports 108 may comprise a staggered elevation profile as shown in FIG. 1. That is, the portion of each of the rolling supports 108 that makes contact with the bottom edge 17 of the vehicle door 10 may be at a different elevation. In some embodiments of the door hoist 100, the elevation of one or more of the rolling supports 108 is adjustable. Additionally, the one or more rolling supports 108 may comprise at least two rolling supports 108 that form a straight line extending in a vehicle lateral direction parallel to the bottom edge 17 of the vehicle door.

The multi-bar actuation assembly 106 may be disposed on the mast 102 at the middle portion 112. As mentioned above, the suction end effectors 104 disposed on the multi-bar actuation assembly 106 may removably couple to the window 21 of the vehicle door 10 to stabilize the vehicle door 10 and rotate it about the bottom edge 17. Additionally, the multi-bar actuation assembly 106 may hold the vehicle door 10 in an installation position while the vehicle door 10 is slid in the vehicle inward direction, toward the vehicle 11 until the vehicle inward side 23 of the vehicle door 10 can be installed on the vehicle 11.

The door hoist 100 and multi-bar actuation assembly 106 may be used to install multiple types of vehicle doors on multiple types of vehicles. As non-limiting examples, the door hoist 100 may be used to install a front left door, a front right door, a rear left door, and/or a rear right door. Additionally, the actuated door hoist may be configured to install doors on vehicles of varying heights and configurations, for example and without limitation, SUVs, sedans, trucks, and/or crossover vehicles.

Figure 2:
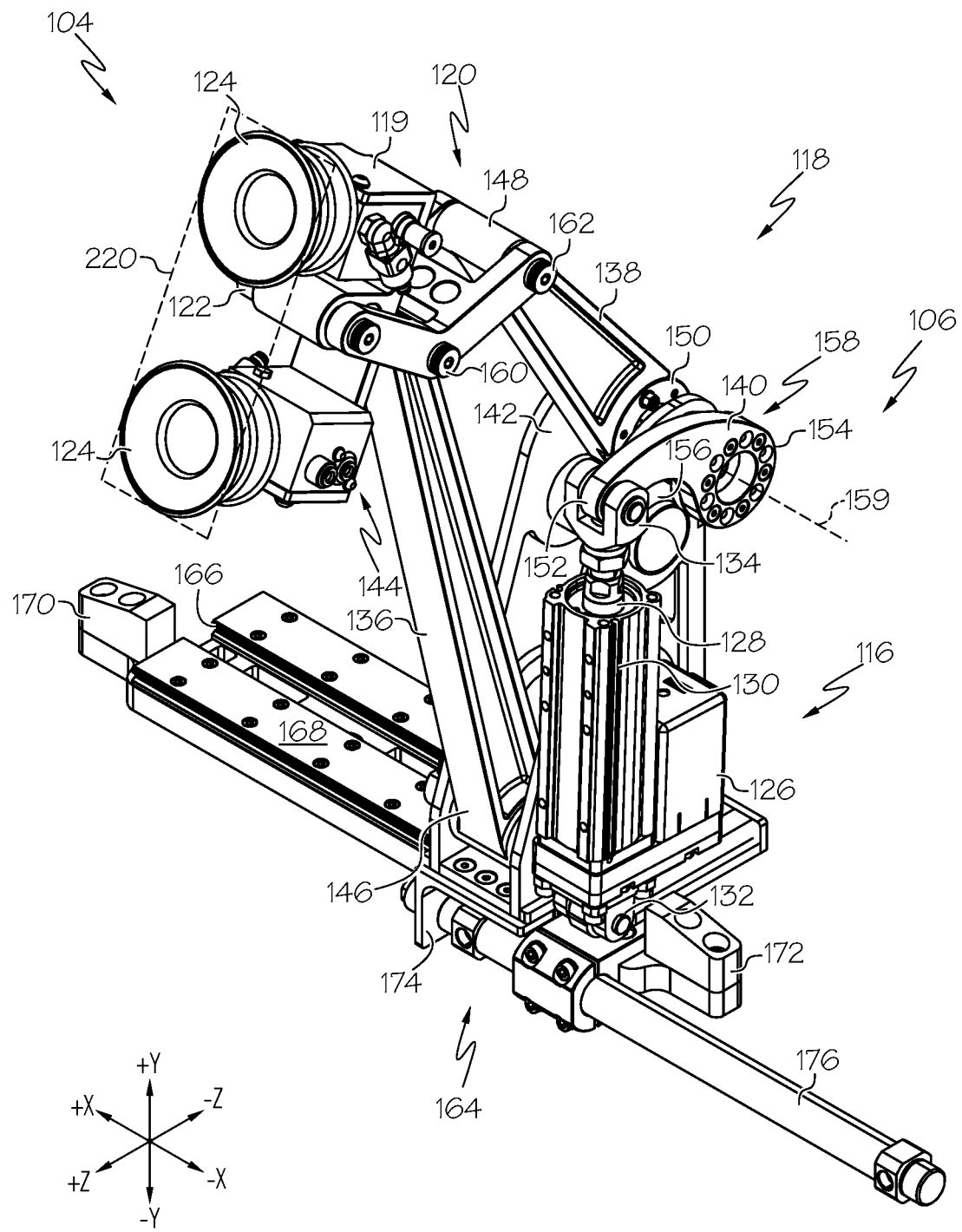
FIG. 2 depicts the multi-bar actuation assembly and suction end effectors of FIG. 1 mounted to a carriage, according to one or more embodiments shown and described herein.

Referring now to FIG. 2, the multi-bar actuation assembly 106 of the door hoist 100 of FIG. 1 is shown in isolation. The multi-bar actuation assembly 106 may include the suction end effectors 104, one or more drives, such as drive 116, and a multi-bar linkage 118 comprising one or more links between the suction end effectors 104 and the drive 116.

The suction end effectors 104 may be coupled together by an end effector base 119 that is coupled to a toggle link 120 of the multi-bar linkage 118 at an end effector pivot 122. The suction end effectors 104 may comprise suction cups 124 for creating a suction force between the multi-bar actuation assembly 106 and the window 21. The suction cups 124 may be made from rubber or some other elastic polymer or the like. As shown in the example in FIG. 2, the multi-bar actuation assembly 106 has two suction cups, but embodiments are not so limited. It is contemplated that embodiments may have any number of suction cups.

The suction cups 124 may each extend to a suction plane 220 that is formed by the lips of each of the suction cups. The suction plane 220 may be formed on the side of the window 21 toward the suction cups 124. In some embodiments the window 21 may not form a flat plane, instead forming a curved surface. For example, in some embodiments, the window 21 may gently curve toward the door hoist 100 along a line traced from the bottom of the window 21 to the top of the window 21. In such a case, the distance that each of the suction cups 124 extend from the end effector base 119 may individually adjust to account for varying surface curvatures amongst different types of windows, such as the window 21.

The drive 116 may be any type of drive, such as a pneumatic, hydraulic, or electric drive. For example, the drive 116 may be a linear actuator. The drive 116 may be powered by a motor 126. In some embodiments, the motor 126 is an electric motor. Non-limiting examples of electric motors include servo motors and stepper motors. In non-limiting example embodiments, the motor 126 may be controlled by a motor controller or a linear actuator controller. In other embodiments, the motor 126 may be operator controlled.

The drive 116 may also include a piston arm 128, a casing 130, a lower drive link 132, and an upper drive link 134. In the example shown in FIG. 2, the upper drive link 134 and the lower drive link 132 comprise clevis links or clevis fasteners but embodiments are not so limited. The piston arm 128 may be driven in and out of the casing 130 by the motor 126, extending and retracting along a stroke length. The length of the piston arm 128 may be adjustable between one or more discreet settings or be continuously linearly adjustable. In one non-limiting example, the full stroke length is 50 mm. Other non-limiting examples of full stroke lengths include 100 mm and 200 mm. Additionally, the piston arm 128 and the casing 130 may rotate about the lower drive link 132 and the upper drive link 134 which both may be coupled to the multi-bar linkage 118.

The multi-bar linkage 118 may comprise the toggle link 120, a first bar link 136, a second bar link 138, an arcuate link 140, and a base support structure 142. It should be understood that the number of links in the multi-bar linkage is not limited to any number but that embodiments including any number of links are possible. For example, other embodiments of the multi-bar linkage 118 may comprise three or four links.

The first bar link 136 may comprise a first bar link first end 144 and a first bar link second end 146. The second bar link 138 may comprise a second bar link first end 148 and a second bar link second end 150. The arcuate link 140 may comprise an arcuate link first end 152 and an arcuate link second end 154 and an arcuate clearance 156. The arcuate clearance 156 may define a cutaway portion of the arcuate link that provides clearance between the arcuate link 140 and the piston arm 128 and casing 130 when the arcuate link 140 is rotated as described below. It is to be understood that the arcuate clearance can take any shape and that embodiments are not limited to an arcuate shape.

The toggle link 120 may have a flat v-shape and comprise the end effector pivot 122, a first bar link pivot 160, and a second bar link pivot 162. The end effector pivot 122 may pivotally couple to the end effector base 119 and enable pivotal motion of the suction end effectors 104. The first bar link pivot 160 and the second bar link pivot 162 may enable further motion of the multi-bar actuation assembly 106 while also fixing the distance between the first bar link first end 144 and the second bar link first end 148 in the vehicle longitudinal direction (+/−X).

The first bar link 136 and the second bar link 138 are pivotally coupled to the toggle link 120. The first bar link first end 144 is pivotally coupled to the toggle link 120 at the first bar link pivot 160 and the second bar link first end 148 is pivotally coupled to the toggle link 120 at the second bar link pivot 162.

Additionally, the first bar link 136, the second bar link 138, and the arcuate link 140 are pivotally coupled to the base support structure 142. The first bar link second end 146 is pivotally coupled to the base support structure 142. The arcuate link second end 154 and the second bar link second end 150 are coupled to the base support structure 142 at a pin 158. The pin 158 couples the arcuate link 140, the second bar link 138, and the base support structure 142 such that the arcuate link 140 and the second bar link 138 rotate with respect to the base support structure 142 about a common rotational axis 159 but not with respect to each other. In this way, as the arcuate link 140 is rotated by the drive 116, the second bar link 138 is also rotated. In some embodiments, the arcuate link 140 and the second bar link 138 may be a single component.

The arcuate link first end 152 is pivotally coupled to the piston arm 128 at the upper drive link 134. As mentioned, the lower drive link 132 pivotally couples the piston arm 128 and the casing 130 to the base support structure 142. Thus, the piston arm 128 can extend and retract out of the casing 130 and the piston arm 128 and the casing 130 can change their angle with respect to the base support structure 142 to rotate the arcuate link 140, thereby rotating the second bar link 138 and repositioning the toggle link 120 and suction end effectors 104 with respect to the door hoist 100 and vehicle 11 of FIG. 1.

Still referring to FIG. 2, the multi-bar actuation assembly 106 may be mounted on a carriage 164. The carriage 164 may comprise one or more slide bearings inside one or more tracks 166 on one or more linear rails 168. The carriage 164 may slide back and forth between a vehicle inward stop 170 and a vehicle outward stop 172 on the linear rails 168. The carriage 164 may slide back and forth between a carriage base position and a carriage installation position along the linear rails 168 to enable movement of the multi-bar actuation assembly 106 in the vehicle longitudinal direction (+/−X) thus allowing the vehicle door 10 to be stabilized by the multi-bar actuation assembly 106 as the vehicle door 10 is pushed toward the vehicle 11 in the vehicle longitudinal direction or to position the suction end effectors 104 appropriately prior to engaging the vehicle door 10.

As shown in FIG. 2, the carriage 164 and multi-bar actuation assembly 106 are in the carriage base position. The carriage base position may be in the vehicle outward direction as compared to the carriage installation position. Additionally, in some embodiments the carriage 164 may be biased toward one end of the linear rails 168 and/or toward one of the positions of the carriage 164. For example, the carriage 164 may be biased in the vehicle outward direction toward the carriage base position In the example shown in FIG. 2, the carriage 164 is biased in the vehicle outward direction (+X) by coupling an L-bracket 174 below the base support structure 142 to an air piston 176. The L-bracket 174 may be coupled to the air piston 176 by drilling a hole through the L-bracket 174 and using a threaded fastener and nut to couple the L-bracket 174 and air piston 176. However, it should be understood that other ways of coupling the L-bracket 174 and air piston 176 are contemplated. The air piston 176 may be pressurized to hold the carriage 164 through the L-bracket 174 in the carriage base position.

Figure 3:
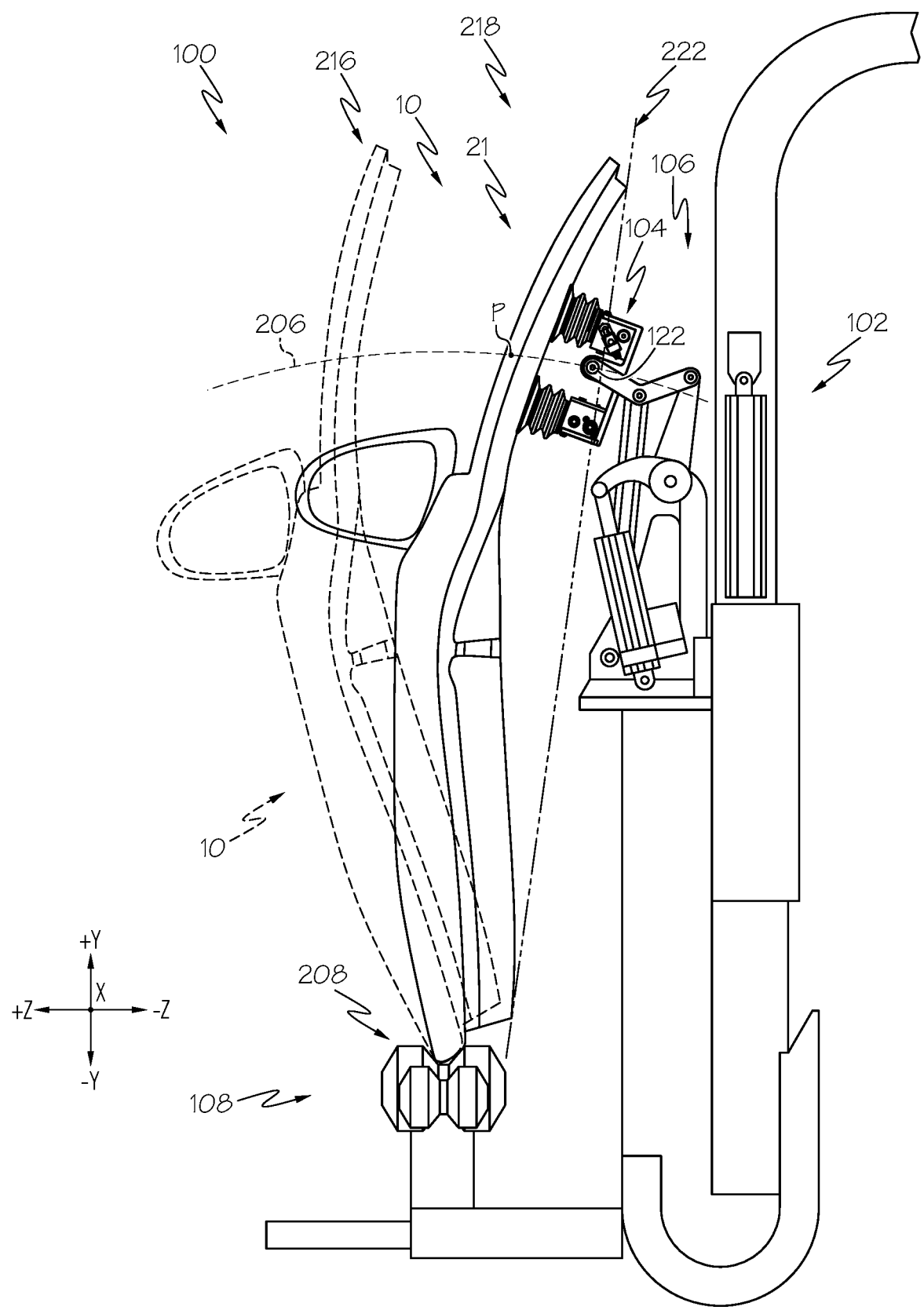
FIG. 3 depicts the vehicle door of FIG. 1 being rotated from a vehicle door initial position to a vehicle door installation position along a door arc by the door hoist and multi-bar actuation assembly of FIG. 1, according to one or more embodiments shown and described herein.
Figure 4:
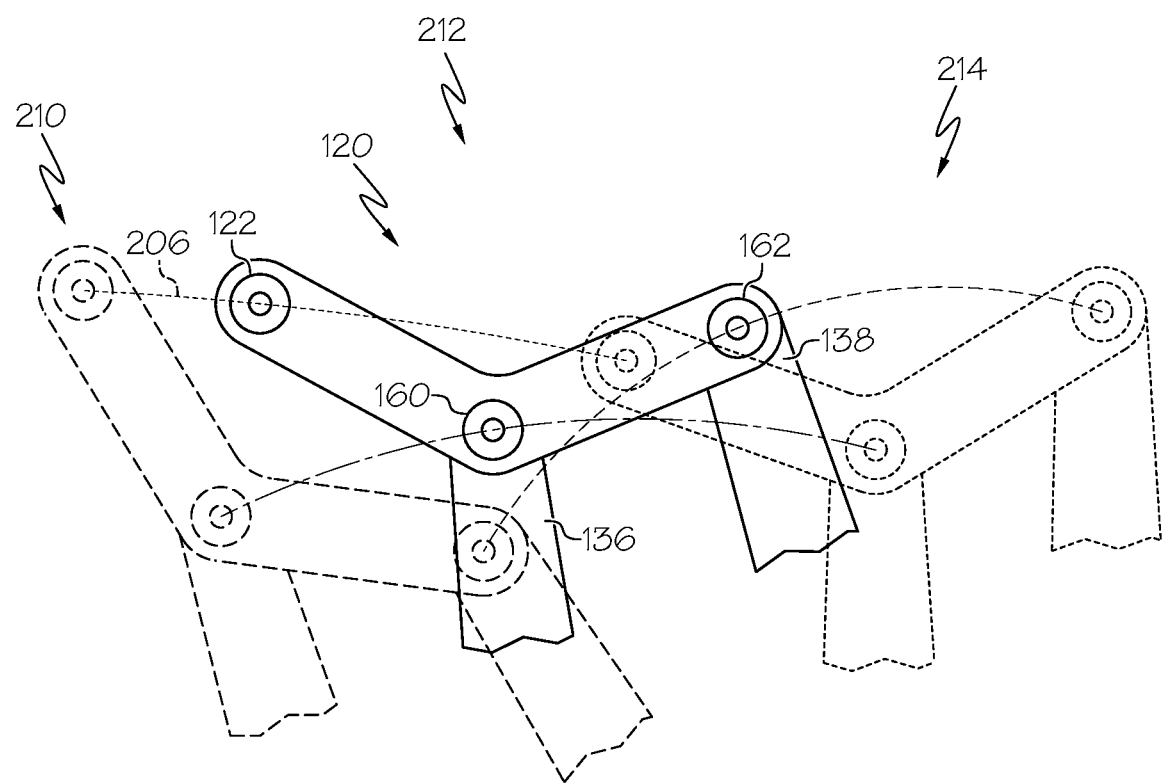
FIG. 4 depicts a partial view of a toggle link of the multi-bar actuation assembly of FIG. 1 following a door arc, according to one or more embodiments shown and described herein.

Referring now to FIGS. 3 and 4, the operation of the door hoist 100 and multi-bar actuation assembly 106 to install the vehicle door 10 will be described. FIG. 3 schematically depicts the vehicle door 10 supported by the rolling supports 108 of the mast 102 and engaged with the suction end effectors 104 and the multi-bar actuation assembly 106 at the window 21. As shown in FIG. 3, the vehicle door 10 has just been rotated from a vehicle door initial position 216 to a vehicle door installation position 218. The vehicle door 10 is rotated by the multi-bar actuation assembly 106 along a door arc 206 about a door arc pivot axis 208. The door arc 206 is a portion of a circular arc formed by selecting a point P on the vehicle door 10 associated with end effector pivot 122 that maintains a constant vertical distance (i.e., a radius) from the door arc pivot axis 208 as the door rotates about the door arc pivot axis 208 formed by the bottom edge 17 such that the end effector pivot 122 travels in the same door arc 206. As shown in FIG. 3, the end effector pivot 122 follows the door arc 206 through the limited distance of radial motion of end effector pivot 122 permitted by the multi-bar actuation assembly 106. The multi-bar actuation assembly 106 is not shown coupled to the vehicle door 10 in the vehicle door initial position 216 for ease of understanding the illustration, however it is to be understood that the multi-bar actuation assembly 106 is coupled to the vehicle door 10 as the vehicle door 10 is pivoted from the vehicle door initial position 216 to the vehicle door installation position 218.

FIG. 4 depicts the toggle link 120 and end effector pivot 122 of the multi-bar actuation assembly 106 in isolation for the purpose of illustrating the motion of the toggle link 120 through three positions: a multi-bar actuation assembly initial position 210, a multi-bar actuation assembly installation position 212, and a multi-bar actuation assembly removal position 214. FIG. 4 shows the end effector pivot 122 following the same door arc 206 shown in FIG. 3, which prevents relative motion in the vehicle vertical direction between the vehicle door 10 and the suction end effectors 104, thus preventing the formation of a shear force on the window 21 as the vehicle door 10 follows the door arc 206 during installation as will be described in greater detail below.

Referring to FIG. 3, the vehicle door 10 may first be placed on the door hoist 100. When on the door hoist 100, the bottom edge 17 of the vehicle door 10 may rest in the rolling supports 108. The elevation of the bottom edge 17 of the vehicle door 10 is thus fixed with respect to the rolling supports 108. Because of the concave profile of the rolling supports 108, the bottom edge 17 of the vehicle door 10 rests in the bottom of the rolling supports 108 and thus the bottom edge 17 of the vehicle door 10 cannot translate in the vehicle longitudinal direction. This means the vehicle door 10 can only rotate about the door arc pivot axis 208 formed at the interface between the bottom edge 17 and the rolling supports 108 and/or translate inward or outward in the vehicle lateral direction by rolling inward or outward in the vehicle lateral direction along the rolling supports 108.

As shown in FIG. 3, the vehicle door 10 may rotate about the door arc pivot axis 208 through at least two positions: the vehicle door initial position 216 and the vehicle door installation position 218. These two vehicle door positions may correspond to two positions of the multi-bar actuation assembly shown in FIG. 4: the multi-bar actuation assembly initial position 210 and the multi-bar actuation assembly installation position 212. As the multi-bar actuation assembly 106 moves through the at least three multi-bar actuation assembly positions the toggle link 120 rotates about the door arc pivot axis 208 and itself to keep the end effector pivot 122 travelling along the door arc 206 for at least the limited range of motion of the vehicle door 10 between the vehicle door initial position 216 and the vehicle door installation position 218.

Referring to FIGS. 3 and 4, the multi-bar actuation assembly 106 may initially make contact with the window 21 of the vehicle door 10 in the multi-bar actuation assembly initial position 210. Coincidentally, the vehicle door 10 may be in a vehicle door initial position 216. The multi-bar actuation assembly initial position 210 may be defined as the position of the multi-bar actuation assembly 106 at the point of initial contact between the vehicle door 10 and the suction end effectors 104 on the multi-bar actuation assembly 106. Similarly, the vehicle door initial position 216 may be defined as the position of the vehicle door 10 at the point of initial contact between the vehicle door 10 and the suction end effectors 104 on the multi-bar actuation assembly 106.

To place the multi-bar actuation assembly 106 in the multi-bar actuation assembly initial position, the door hoist 100 may actuate by extending or retracting the piston arm 128 or by changing the angle between the piston arm 128 and the casing 130 and the base support structure 142. Either or both of these actions will set the multi-bar actuation assembly 106 in motion. In one embodiment, the motor 126 may activate to change the length of the piston arm 128. As the piston arm 128 changes length, the second bar link 138, which is coupled to the piston arm 128, also changes length and thus the angle between the second bar link 138 and the unmoving portions of the door hoist 100 changes. In one example embodiment, the second bar link 138 is coupled to the piston arm 128 through the arcuate link 140. The length of the piston arm 128 may be adjusted until the suction end effectors 104 are in contact with the window 21 at which point the multi-bar actuation assembly 106 is in the initial position.

Because the suction end effectors 104 can pivot about the end effector pivot 122, the suction plane 220 created by the suction cups 124 can also pivot, and thus, the angle of the suction plane 220 is adjustable to match the angle of the window 21. In some embodiments, the end effector pivot 122 is freely rotatable such that the angle of the suction plane 220 changes as the suction cups 124 come into contact with the window 21 when the multi-bar actuation assembly 106 is moved to the multi-bar actuation assembly initial position 210. In other embodiments, the angle of the suction plane 220 may be set before the suction cups 124 contact the window 21. For example, the angle of the suction plane 220 may be set to the angle of interface that will exist between the window 21 and the suction plane 220 when the window 21 and the suction plane 220 are in contact with the multi-bar actuation assembly 106 in the multi-bar actuation assembly initial position 210 and the vehicle door 10 in the vehicle door initial position 216. Further, as described above, the extent that each of the suction cups 124 extends from the end effector base 119 may be individually adjusted to account for curvature in the window 21 ensuring that the suction cups 124 can maintain a sufficient seal on the window 21.

Once the suction cups 124 are in contact with the window 21, suction is taken against the window 21 of the vehicle door 10 by lowering the pressure within cavity created by the suction cups 124. The suction pressure temporarily fixes the suction end effectors 104 and thus the multi-bar actuation assembly 106 through the multi-bar linkage 118 to the vehicle door 10. The suction end effectors 104 may be drawn slightly toward the window 21, or vice versa, as suction is drawn pulling the toggle link 120 toward the window 21. The magnitude of the suction pressure is at least great enough to pull the vehicle door 10 to rotate the vehicle door 10 about the door arc pivot axis 208. The magnitude of the suction pressure may change based characteristics of the particular vehicle door being installed, such as, for example, the weight of the particular vehicle door being installed or the curvature of the window of the particular vehicle door being installed.

Once the suction pressure locks the multi-bar actuation assembly 106 to the window 21, the multi-bar actuation assembly 106 can rotate the vehicle door 10. Specifically, the motor 126 may be energized to actuate the drive 116 to push the piston arm 128 out of the casing 130 and rotate the arcuate link 140 in a clockwise direction. Because the arcuate link 140 may be directly coupled to the second bar link 138 at the pin 158, the second bar link 138 may also rotate in a counter clockwise direction, pulling the toggle link 120 rearward in the vehicle longitudinal direction. As the toggle link 120 moves rearward in the vehicle longitudinal direction, the end effector pivot 122 rotates counter clockwise about the door arc pivot axis 208 following the door arc 206.

As shown in FIG. 4, the end effector pivot 122 may follow the door arc 206 from the multi-bar actuation assembly initial position 210 to the multi-bar actuation assembly installation position 212. This may pull the suction end effectors 104, which are not shown in FIG. 4 for clarity of illustration, in the counter clockwise direction with the end effector pivot 122. As shown in FIG. 3, as the multi-bar actuation assembly 106 travels, it pulls the vehicle door 10 along the door arc 206 from the vehicle door initial position 216 to the vehicle door installation position 218. It should be understood that vehicle doors on opposing sides of the vehicle 11 may be rotated in opposite directions. For example, vehicle doors on the left side of the vehicle 11, such as vehicle door 10, may be rotated clockwise about the door arc pivot axis 208 as viewed from the left side of the vehicle 11, outside the vehicle door 10 with respect to the vehicle 11. Vehicle doors on the right side of the vehicle 11 may be rotated counter clockwise about a similar door arc pivot axis on a door on the right side of the vehicle 11 as viewed from the right side of the vehicle 11 from outside the vehicle door 10 with respect to the vehicle 11.

The end effector pivot 122 may only follow the door arc 206 for a limited range of motion along the door arc 206. For example, the range of motion of the multi-bar actuation assembly 106, and thus the end effector pivot 122, may be limited by the first bar link 136 contacting the second bar link 138 and the arcuate link 140 not being able to rotate further in the counter clockwise direction (as shown in FIG. 3) because of the length of the piston arm 128.

Because the bottom edge 17 of the vehicle door 10 is supported by the rolling supports 108 and the multi-bar linkage 118 through the suction end effectors 104, the weight of the vehicle door 10 may be easily manipulated. That is, the weight of the vehicle door 10 may be lifted entirely by the rolling supports 108 and rotation of the vehicle door 10 about the door arc pivot axis 208 may require relatively little additional torque from an operator other than that supplied by the multi-bar actuation assembly 106. For example, the vehicle door 10 may be positioned into the installation position by hand by a human operator, or with very little effort from an automated mechanical operator, such as, for example, a robot.

Additionally, because the vehicle door 10 and the end effector pivot 122 both follow the door arc 206, there is no relative motion between the end effector pivot 122 and the vehicle door 10 in the radial direction about the door arc pivot axis 208. Accordingly, there is no shear force generated along the suction plane 220 as the vehicle door 10 is pulled from the vehicle door initial position 216 to the vehicle door installation position 218. Said another way, the only force resulting on the vehicle door 10 from the suction cups 124 as the vehicle door 10 is pulled from the vehicle door initial position 216 to the vehicle door installation position 218 is along a line that is tangent to the door arc and rearward in the vehicle longitudinal direction. Additionally, the suction plane 220 may be perpendicular to this tangent line along the door arc 206.

Once the vehicle door 10 has been rotated to the vehicle door installation position 218, the vehicle door 10 may be pushed in the vehicle inward direction toward the vehicle 11 to couple the vehicle door 10 to the vehicle frame 12. The weight of the vehicle door 10 may be supported by the mast 102 as the vehicle door 10 is pushed inward. Briefly referring to FIG. 1, the bottom edge 17 of the vehicle door 10 may roll in the vehicle inward direction along the rolling supports 108. Because the vehicle door 10 is supported by the rolling supports 108 and the multi-bar actuation assembly 106 is supported on the carriage 164, resistance to the inward motion of the vehicle door 10 is limited to the internal resistance of the bearings that rotate within the rolling supports 108 and the carriage 164. This resistance is relatively small and therefore, even potentially very heavy vehicle doors can be pushed inward manually by a human operator or by an automated mechanical operator, such as, for example, a robot.

Accordingly, the vehicle door 10 may be pushed in the vehicle inward direction by a human operator or an automated mechanical operator. As the vehicle door 10 is pushed in the vehicle inward direction, the multi-bar actuation assembly 106 moves with the vehicle door 10 because the multi-bar actuation assembly 106 is fixedly mounted on the carriage 164, which slides back and forth in the vehicle inward and outward directions between the carriage base position and the carriage installation position, as described above. Because the vehicle door 10 and the multi-bar actuation assembly 106 slide together toward the vehicle 11, there is no relative motion between the suction end effectors 104 and the window 21 as the vehicle door 10 is positioned against the vehicle frame 12 and hence, no shear force develops between the suction cups 124 and the window 21 in the vehicle inward or outward direction at the suction plane 220.

Still referring to FIG. 1, the vehicle door 10 is pushed in the vehicle inward direction until the vehicle inward side 23 of the vehicle door 10 is in contact with the vehicle frame 12. The vehicle door 10 may then be permanently fixed to the vehicle frame 12. For example, the vehicle door 10 may be bolted to the vehicle frame 12 using one or more bolts at one or more hinged connections allowing rotation of the vehicle door 10 about the one or more hinged connections (i.e., allowing the vehicle door 10 to open and shut). Once the vehicle door 10 is installed, the vehicle door is permanently fixed to the vehicle frame 12 and rotation of the vehicle door 10 about the door arc pivot axis 208 may be prevented. The vehicle door 10 may be mounted to the vehicle frame 12 at one or more hinged connections and may swing in and out from the vehicle frame 12 at the connection with the vehicle frame 12 about an axis in the vehicle vertical direction. The vehicle inward stop 170 (FIG. 2) may prevent excessive inward motion of the vehicle door 10 in the vehicle lateral direction and thus may prevent the vehicle inward side 23 of the vehicle door 10 from improperly impacting the vehicle 11.

Referring once again to FIGS. 3 and 4, once the vehicle door 10 is installed on the vehicle 11, the multi-bar actuation assembly 106 may rotate to a third multi-bar actuation assembly position, the multi-bar actuation assembly removal position 214. In the multi-bar actuation assembly removal position 214, the multi-bar actuation assembly 106 may be clear of a vehicle door clearance plane 222. The vehicle door clearance plane 222 may be defined as a plane that extends between the vehicle door 10 and the suction end effectors 104 and that no part of the suction end effectors 104 extends beyond on the side of the vehicle door 10 such that when the multi-bar actuation assembly 106 travels outward in the vehicle lateral direction after installation of the vehicle door 10, no part of the suction end effectors 104 could contact the vehicle door 10. In the example embodiment shown in FIG. 3, the vehicle door clearance plane 222 is a flat plane, however, it is contemplated that the vehicle door clearance plane 222 may be a curved plane, such as, for example, a curve that follows an inner profile of the vehicle door 10.

In some embodiments, once the multi-bar actuation assembly 106 is clear of the vehicle door clearance plane 222, the carriage 164 may slide outward in the vehicle lateral direction to return to the carriage base position. As described above, the carriage 164 may be biased toward the carriage base position and thus the carriage 164 may return to the carriage base position without additional external input, for example, from a user of the door hoist 100. Because the multi-bar actuation assembly 106 is mounted to the carriage 164, it too may slide outward in the vehicle lateral direction. The outward motion of the carriage 164 in the vehicle lateral direction may be halted by the vehicle outward stop 172 (FIG. 2).

Many vehicle bodies may have symmetric characteristics and dimensions across a longitudinal axis of the vehicle that bisects the vehicle. For example, a left-side vehicle door may be symmetric with a right-side vehicle door. Accordingly, some settings of the multi-bar actuation assembly 106, for example, the length of the piston arm 128 and the degree of rotation of the arcuate link 140 necessary to rotate the vehicle door 10 from a vehicle door initial position 216 to a vehicle door installation position 218 without developing a shear force between the window 21 and the suction end effectors 104 may be equivalent on the left side and right side of the vehicle.

Additionally, it may be possible change some settings of the multi-bar actuation assembly, for example, the length of the piston arm 128 and the degree of rotation of the arcuate link 140 to apply the door hoist 100 and multi-bar actuation assembly 106 to various types and/or makes various makes/models of vehicles using the principles described herein. For example, an SUV may have a taller door than the vehicle 11 shown in FIG. 1, which is, for example purposes only, a sedan. Hence, a longer distance between the suction end effectors 104 and the rolling supports 108 may be necessary for the SUV. Because the middle portion 112 of the mast 102 can extend and retract and the distance between the multi-bar actuation assembly 106 and the rolling supports 108 can increase or decrease, the door hoist 100 and multi-bar actuation assembly 106 may be configured to install vehicle doors of varying heights like an SUV or a sedan.

It should now be understood that it may be advantageous to use one or more mechanisms for hoisting, positioning, and installing a vehicle door that do not touch the A-pillar portion of the door or the door window frame and instead fasten to the door using suction at the door window. For example, one or more suction cups may temporarily fix to the window of a vehicle door to hold the vehicle door in place and manipulate the vehicle door into a position suitable for installation. It should be further understood that reduction or elimination of shear force between the window and the suction cups may be possible if relative motion between the window and the suction cups is reduced or eliminated. To reduce or eliminate any shear force between the window and the suction cups, the suction cups may follow the same arc as the vehicle door they pull to rotate the vehicle door into the installation position. Accordingly, a door hoist apparatus including multi-bar actuation assemblies with suction end effectors for holding, positioning, and installing a vehicle door on a vehicle is described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. As used herein, the terms "outward" and "inward" in reference to the vehicle lateral direction refer to outward and inward with regard to a central axis that extends along the center of a vehicle that is being assembled using the door hoist apparatus described herein. The vehicle may be generally symmetrical about the central axis and inward may refer to the direction moving toward the central axis from either the left or the right side of the vehicle and the term outward may refer to the direction away from the central axis of the vehicle from either the left or the right side of the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-bar actuation assembly for use in installing a vehicle door to a vehicle, the multi-bar actuation assembly comprising:
   a drive comprising a piston arm and a casing that movably receives the piston arm;
   a multi-bar linkage comprising:
   a base support structure;
   a first bar link pivotally connected to the base support structure;
   a second bar link pivotally connected to the drive and the base support structure; and
   a toggle link connected to the first bar link at a first bar link pivot and to the second bar link at a second bar link pivot; and
   a suction end effector pivotally connected to the toggle link at an end effector pivot that engages a window of the vehicle door, the end effector pivot at a different location on the toggle link than the first bar link pivot and the second bar link pivot;

wherein the drive extends and contracts the piston arm thereby moving the end effector pivot along a door arc about a door pivot axis with the suction end effector engaged with the window of the vehicle door;

wherein the first bar link is longer than the second bar link.

2. The multi-bar actuation assembly of claim 1, further comprising:

an arcuate link pivotally connected to the piston arm and fixed to the second bar link, wherein the arcuate link and the second bar link rotate with respect to the base support structure about a common rotational axis as the suction end effector translates forward and backward.

3. The multi-bar actuation assembly of claim 2, wherein the arcuate link comprises an arcuate clearance that provides a clearance between the arcuate link and the piston arm when the piston arm extends from the casing.

4. The multi-bar actuation assembly of claim 1, wherein the suction end effector comprises one or more suction cups that extend to a suction plane.

5. The multi-bar actuation assembly of claim 1, wherein the drive comprises a linear actuator.

6. The multi-bar actuation assembly of claim 1, wherein the drive extends and contracts the piston arm to rotate the second bar link about a common rotational axis, wherein rotation of the second bar link rotates the first bar link such that the end effector pivot follows the door arc about the door pivot axis with the suction end effector engaged with the window of the vehicle door.

7. The multi-bar actuation assembly of claim 6, wherein the drive is coupled to the second bar link through an arcuate link that is fixedly coupled to the second bar link and configured to rotate about the common rotational axis.

8. A door hoist apparatus for use in installing a vehicle door to a vehicle, the door hoist apparatus comprising:

a multi-bar actuation assembly comprising:
   a drive comprising a piston arm and a casing that movably receives the piston arm;
   a multi-bar linkage comprising:
      a base support structure;
      a first bar link pivotally connected to the base support structure;
      a second bar link pivotally connected to the drive and the base support structure; and
      a toggle link connected to the first bar link at a first bar link pivot and to the second bar link at a second bar link pivot; and
   a suction end effector pivotally connected to the toggle link at an end effector pivot that engages a window of the vehicle door, the end effector pivot at a different location on the toggle link than the first bar link pivot and the second bar link pivot;
   wherein the first bar link is longer than the second bar link; and a mast that comprises one or more rolling supports that support the vehicle door as the vehicle door is rotated about a door arc pivot axis from a vehicle door initial position to a vehicle door installation position, wherein the drive is actuatable to move the end effector pivot and the suction end effector along a door arc about the door arc pivot axis with the suction end effector engaged with the window of the vehicle door.

9. The door hoist apparatus of claim 8, wherein the multi-bar actuation assembly further comprises:

an arcuate link pivotally connected to the piston arm and fixed to the second bar link, wherein the arcuate link and the second bar link rotate with respect to the base support structure about a common rotational axis as the suction end effector translates forward and backward.

10. The door hoist apparatus of claim 9, wherein the arcuate link comprises an arcuate clearance that provides a clearance between the arcuate link and the piston arm when the piston arm extends from the casing.

11. The door hoist apparatus of claim 8, wherein the suction end effector comprises one or more suction cups that extend to a suction plane.

12. The door hoist apparatus of claim 8, further comprising a carriage that allows translation of the multi-bar actuation assembly inward and outward in a vehicle lateral direction such that the multi-bar actuation assembly can translate inward and outward in the vehicle lateral direction along with the vehicle door.

13. The door hoist apparatus of claim 12, wherein the carriage is biased outward in the vehicle lateral direction.

14. The door hoist apparatus of claim 8, wherein the drive comprises a linear actuator.

15. The door hoist apparatus of claim 8, wherein an elevation of each of the one or more rolling supports is individually adjustable.

16. A method of installing a vehicle door to a vehicle, the method comprising:

extending a suction end effector comprising one or more suction cups attached to a multi-bar actuation assembly to engage a window of the vehicle door thereby placing the multi-bar actuation assembly in a multi-bar actuation assembly initial position, the multi-bar actuation assembly comprising:
   a drive comprising a piston arm and a casing that movably receives the piston arm;
   a multi-bar linkage comprising:
      a base support structure;
      a first bar link pivotally connected to the base support structure;
      a second bar link pivotally connected to the drive and the base support structure; and
      a toggle link connected to the first bar link at a first bar link pivot and to the second bar link at a second bar link pivot; and
   the suction end effector is pivotally connected to the toggle link at an end effector pivot that engages the window of the vehicle door, the end effector pivot at a different location on the toggle link than the first bar link pivot and the second bar link pivot;
   wherein the first bar link is longer than the second bar link;

capturing the vehicle door at the window of the vehicle door with the suction end effector; and moving the piston arm, thereby moving the end effector pivot along a door arc about a door pivot axis.

17. The method of claim 16, wherein the step of moving the piston arm comprises extending the piston arm to rotate the second bar link about a common rotational axis, wherein rotation of the second bar link rotates the first bar link such that the end effector pivot follows the door arc about the door pivot axis with the suction end effector engaged with the window of the vehicle door, the vehicle door rotating from the vehicle door initial position to the vehicle door installation position.

18. The method of claim 17, wherein:

the multi-bar actuation assembly further comprises an arcuate link that is fixedly coupled to the second bar link and configured to rotate about the common rotational axis and the drive is coupled to the second bar link through the arcuate link; and wherein the step of moving the piston arm comprises:

extending the piston arm to rotate the arcuate link about the common rotational axis, thereby rotating the second bar link about the common rotational axis and rotating the first bar link such that the end effector pivot follows the door arc about the door pivot axis with the suction end effector engaged with the window of the vehicle door, the vehicle door rotating from the vehicle door initial position to the vehicle door installation position.

* * * * *